United States Patent [19]

Harman et al.

[11] Patent Number: 5,013,897

[45] Date of Patent: May 7, 1991

[54] AUTOMATED VIDEOCASSETTE DISPENSING TERMINAL COUPLED TO STORE'S COMPUTERIZED RENTAL SYSTEM

[75] Inventors: Robert R. Harman, Seaford, Del.; Bruce. C. Joslyn, Madison, Conn.

[73] Assignee: Thru-The-Wall Corporation, Westport, Conn.

[21] Appl. No.: 227,618

[22] Filed: Aug. 3, 1988

[51] Int. Cl.[5] .................... G06F 15/21; G06F 15/24

[52] U.S. Cl. .................... 235/381; 235/375; 235/385

[58] Field of Search .............. 235/375, 379, 380, 381, 235/383, 385, 462, 487, 488, 457; 902/22, 24, 30; 364/408

[56] References Cited

U.S. PATENT DOCUMENTS

| | | | |
|---|---|---|---|
| 3,956,615 | 5/1976 | Anderson et al. | 235/381 |
| 4,317,957 | 3/1982 | Sendrow | 235/379 |
| 4,589,069 | 5/1986 | Endo et al. | 235/381 |
| 4,598,810 | 7/1986 | Shore et al. | 902/22 |
| 4,608,487 | 8/1986 | Awane et al. | 235/375 |
| 4,761,543 | 8/1988 | Hayden | 235/457 |
| 4,812,629 | 3/1989 | O'Neil et al. | 235/462 |
| 4,814,592 | 3/1989 | Bradt et al. | 235/375 |
| 4,839,875 | 6/1989 | Kuriyama et al. | 235/375 |

FOREIGN PATENT DOCUMENTS

| | | |
|---|---|---|
| 2563985 | 11/1985 | France . |
| WO85/01812 | 4/1985 | PCT Int'l Appl. . |
| WO88/06771 | 9/1989 | PCT Int'l Appl. . |
| 2143662 | 2/1985 | United Kingdom . |

*Primary Examiner*—Stuart S. Levy
*Assistant Examiner*—Robert Weinhardt
*Attorney, Agent, or Firm*—Ostrolenk, Faber, Gerb & Soffen

[57] ABSTRACT

A system for renting pre-recorded videocassettes in which an automatic videocassette dispensing terminal communicates with and becomes part of store's computerized videocassette rental system. The store's computer receives and complies information relating to customer rentals from both the automatic videocassette dispensing terminal and the manned point-of-sale terminal in the store. The automatic videocassette dispensing terminal projects through an exterior wall of the video store to provide 24-hour operation.

18 Claims, 5 Drawing Sheets

FIG. 1.

AUTOMATED VIDEOCASSETTE DISPENSING TERMINAL COUPLED TO STORE'S COMPUTERIZED RENTAL SYSTEM

BACKGROUND OF THE INVENTION

1. Field of the Invention:

The present invention relates generally to a computerized video rental system which includes not only point-of-sale terminals, but also a videocassette dispensing terminal.

2. Description of the Related Art

The rental of pre-recorded videocassettes is becoming increasingly popular as more and more individuals and families acquire videocassette recorders. Typically, an individual seeking to rent cassettes purchases, or is assigned at no charge, a membership at a particular rental store or chain of rental stores. Membership establishes that the store is willing to loan valuable pre-recorded videocassettes to a person who will be responsible for returning the pre-recorded videocassette within or close to the rental period. Once such a membership has been obtained, the individual is free to browse through the collection of available pre-recorded videocassettes on display at the store, and choose from among the available cassettes for overnight rental at a prescribed rental rate. Ordinarily, the individual will take the empty jackets of the desired cassettes to the rental counter and the store clerk will retrieve the corresponding cassettes, if available. Alternatively, "live merchandise" (pre-recorded videocassettes left in their protective jackets) is displayed on the store's shelving and secured by a system of stickers and doorway detectors, in which case the customer hands the desired cassettes to the store clerk. In either case, in order to register the rental transaction, the store clerk proceeds to enter both the individual's membership number and the cassettes being rented into the store's videocassette rental system. Such rental systems, whether manual or computerized, must minimally keep track of:

(1) the customer who made the rental;

(2) the title rented and preferably the copy number of that title);

(3) when the rental occurred; and (4) when the videocassette was due back and when it was actually returned.

The rental store must keep track of the above information so that the proper rental fee can be calculated (either manually or automatically) when the cassette is returned (even if the fee is paid in advance). Moreover, it is important for the rental store to maintain accurate inventory, not only of which cassettes remain in stock, but of cassettes which have been renting most often so that additional copies of frequently requested titles can be purchased to ensure an adequate supply, and so that slow renting titles can be sold while they still have value.

In recent years, most video store rental systems have become computerized. In such computerized systems, rental and return transactions are entered by the clerks through point-of-sale (POS) terminals at the store counter, each of which is coupled to the store's host computer.

Unfortunately, however, when the video store closes and the clerks leave, all rental activity must necessarily cease, and yet some customers would be very interested in obtaining a videocassette after the store has closed. Furthermore, 100% of the revenue from a tape that cannot be rented because it is locked in the store is lost profit. Thus, automated videocassette dispensing terminals, analogous to bank automatic teller machines, would be quite valuable to video rental stores.

Although automated videocassette dispensing machines (VDMs) have been built, sold, and used in quantity, e.g. U.S. Pat. No. 4,668,150 to Blumberg, these units have never been made, designed or even proposed to work with a store's computerized videocassette rental system. As such, the inventory records they maintain must be merged each day with the records maintained by the store's computerized videocassette rental system, and recordkeeping becomes tedious, not only because cassettes are being rented throughout each day, but because titles are constantly being added and deleted from stock as customer preferences change. Generally, because separate inventories are maintained, cassettes rented from a VDM must be returned to that VDM. Thus, the VDM must be capable of mechanically accepting, recognizing, and registering returns, as well as authorizing credit or accepting payment (whether at rental or return). If payment is not made at time of rental or return, the VDM operator must add a billing system resulting in credit authorization, clerical, financial and bad debt burdens. Moreover, whenever a new title is added, it must be separately keyed into both the store's system and the VDM. Similarly, when authorized members are added, they must be keyed into both the store's system and the VDM. VDM's must also provide physical security around the entire machine to protect their expensive contents. For all the above reasons, VDM's are inherently complex, expensive and unreliable.

The concept of providing an automated videocassette dispensing terminal conveniently located in supermarkets, convenience store, office buildings, and apartment buildings for customer use and remote from a central processing location has also been disclosed in the prior art, e.g. in U.S. Pat. No. 4,300,040 to Gould et al. In accordance with the teachings of this patent, the terminal is coupled to a central processing location via a communications link. The terminal supplies the selected videocassette directly to the customer upon acceptance of an order. Customer billing and control of inventory of videocassettes at the terminal are handled at the processing location.

While the above-described system might be preferable over stand-alone VDM's from an inventory management standpoint, the system is not integrated with a store's existing automated videocassette rental system and the corresponding POS terminals manned by clerks. Thus, again, the system must do all the functions of a video store itself, including authorizing rentals, accepting returns and maintaining inventory (which would have to be merged with the store's inventory and membership lists if cassettes are also rented by clerks).

SUMMARY OF THE INVENTION

The present invention overcomes the above-mentioned deficiencies of the prior art by providing a system in which an automated videocassette dispensing terminal becomes part of a store's automated videocassette rental system by communicating directly with the store's host computer. Thus, the present invention is essentially an add-on to the store's existing computerized rental system, needing more help from the store's host computer than, but functioning identically to, a manned POS terminal.

The system of the present invention maintains rental authorization control, inventory accounting, and rental calculations in the store's computerized videocassette rental system, while allowing 24-hour rentals through the automatic videocassette dispensing terminal. The present invention thus, for the first time, takes advantage of the existing capability of the store's host computer to store and process customer rental and inventory information from files which already are maintained routinely by trained clerks. Thus, the automated rental system of the present invention, and the automated videocassette dispensing terminal used therein, are much simpler, less expensive, and more reliable than the VDM's systems described in the prior art.

Inventory accounting and rental history accounting is simplified in accordance with the present invention since only one computer (the store's host computer) compiles rental information, and no end-of-day merging is required. The system of the present invention is also advantageous from a business standpoint. Since the automated videocassette dispensing terminal must be custom designed to work with each computerized videocassette rental system, it is natural for it to also be sold, installed, and warranted by the individual manufacturers of computerized video rental systems. The automated videocassette dispensing terminal can be sold by a computerized video rental system manufacturer to a store owner either as an add-on to the store owner's existing computerized point-of-sale system (made by that same manufacturer) or in a package with a new point-of-sale system. In the former case, the store owner has the comfort of knowing that: (1) the automated terminal will fit and not damage his existing system, and (2) he can still use only one videocassette rental system and will not have to combine membership lists and inventories.

The automated videocassette dispensing terminal used in the system of the present invention can communicate with the host computer either through a local area network or by means of multi-user architecture. In the preferred embodiment of the invention, the automated terminal replaces an existing door or window of the rental store, or, if a door or window is not available, the terminal projects through the front wall of the store. The former type of installation advantageously in most cases requires no building permit and is usually not considered a leasehold improvement. The terminal is preferably hard-wired to the store's host computer. Obviously, however, the 24-hour automated terminal could be situated in any desired location, and could communicate to the store's host computer via infrared, RF, cable, telephone, fiber optics, or any other appropriate signal transmission technique.

BRIEF DESCRIPTION OF THE DRAWINGS

These and other objects and features of the present invention will become apparent to those skilled in the art from the following description when taken in conjunction with the following drawings.

DETAILED DESCRIPTION OF THE PREFERRED EMBODIMENT

Figure 1:
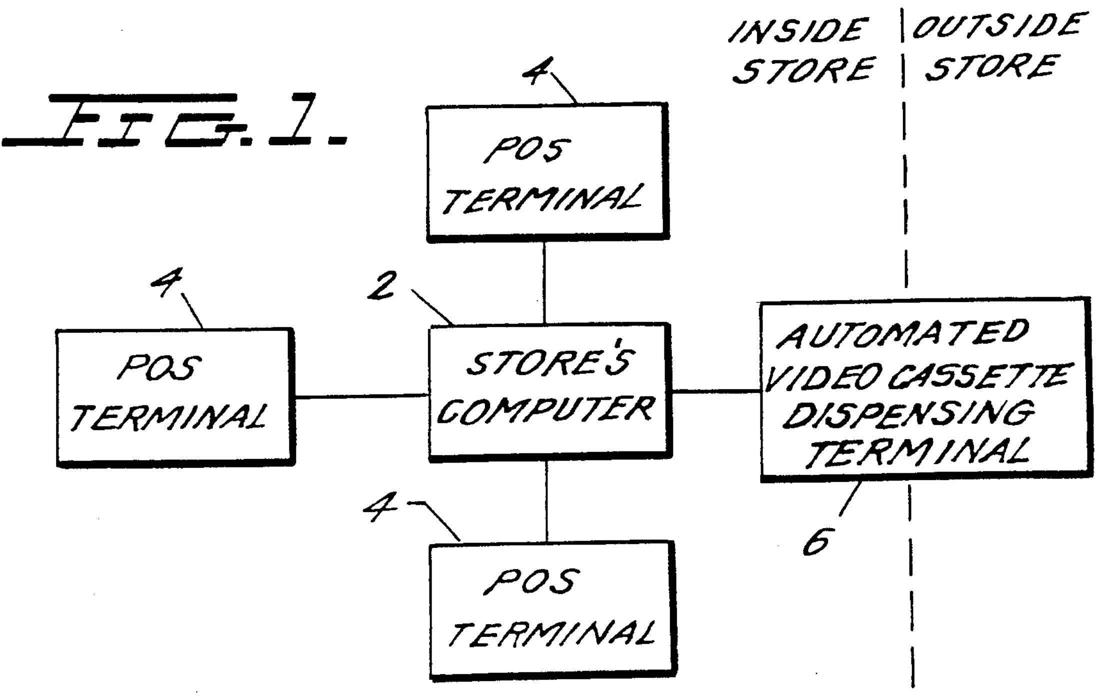
FIG. 1 is an overall block diagram of the present invention.
Figure 3:
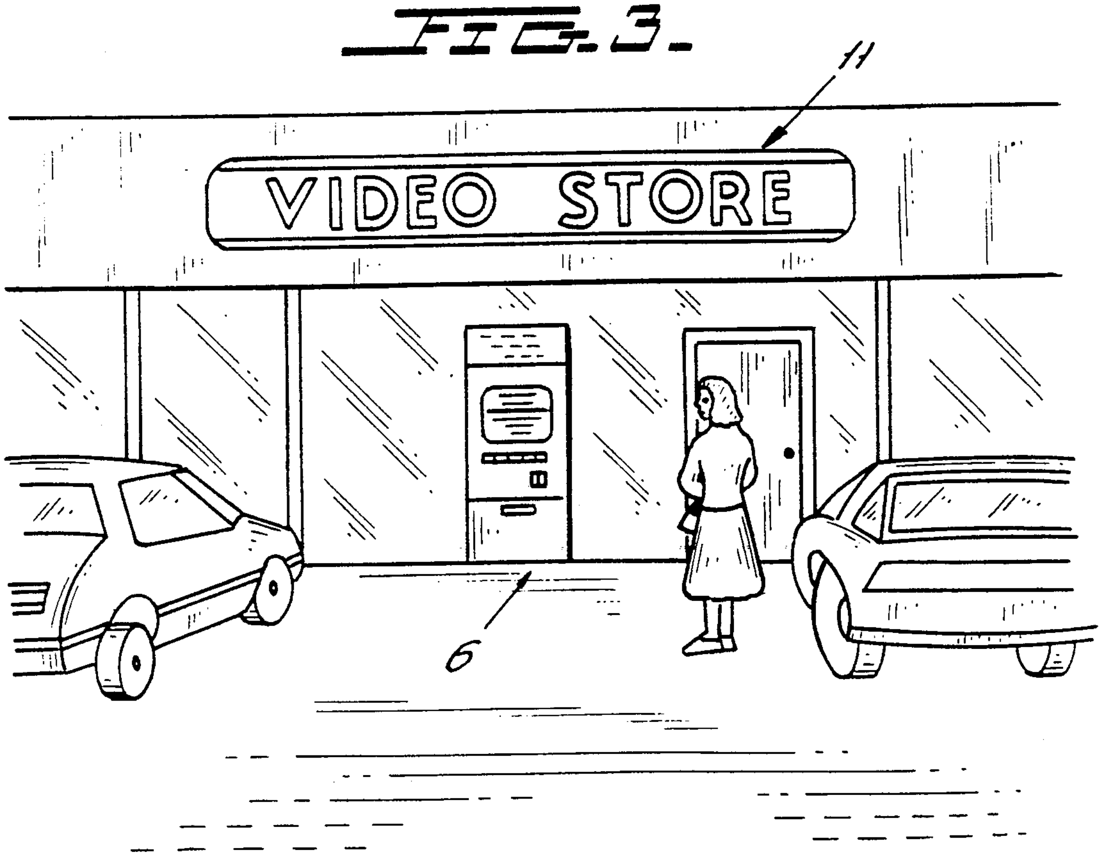
FIG. 3 illustrates the automated videocassette dispensing terminal projecting through the front window of a video store in the preferred embodiment of the invention.

Referring first to FIG. 1, an overall system block diagram is shown in which a store's host computer 2 is coupled to a number of POS terminals 4 inside the store. POS terminals 4 are manned by clerks who enter customer identification information and videocassette identification information into computer 2 through terminals 4 each time a videocassette is rented.

In accordance with the present invention, an automated videocassette dispensing terminal 6 is also coupled to computer 2. As shown in FIG. 1, the automated terminal 6 preferably extends through the store structure so that is is accessible from outside the store and can be used on a 24-hour basis by rental customers.

Figure 2:
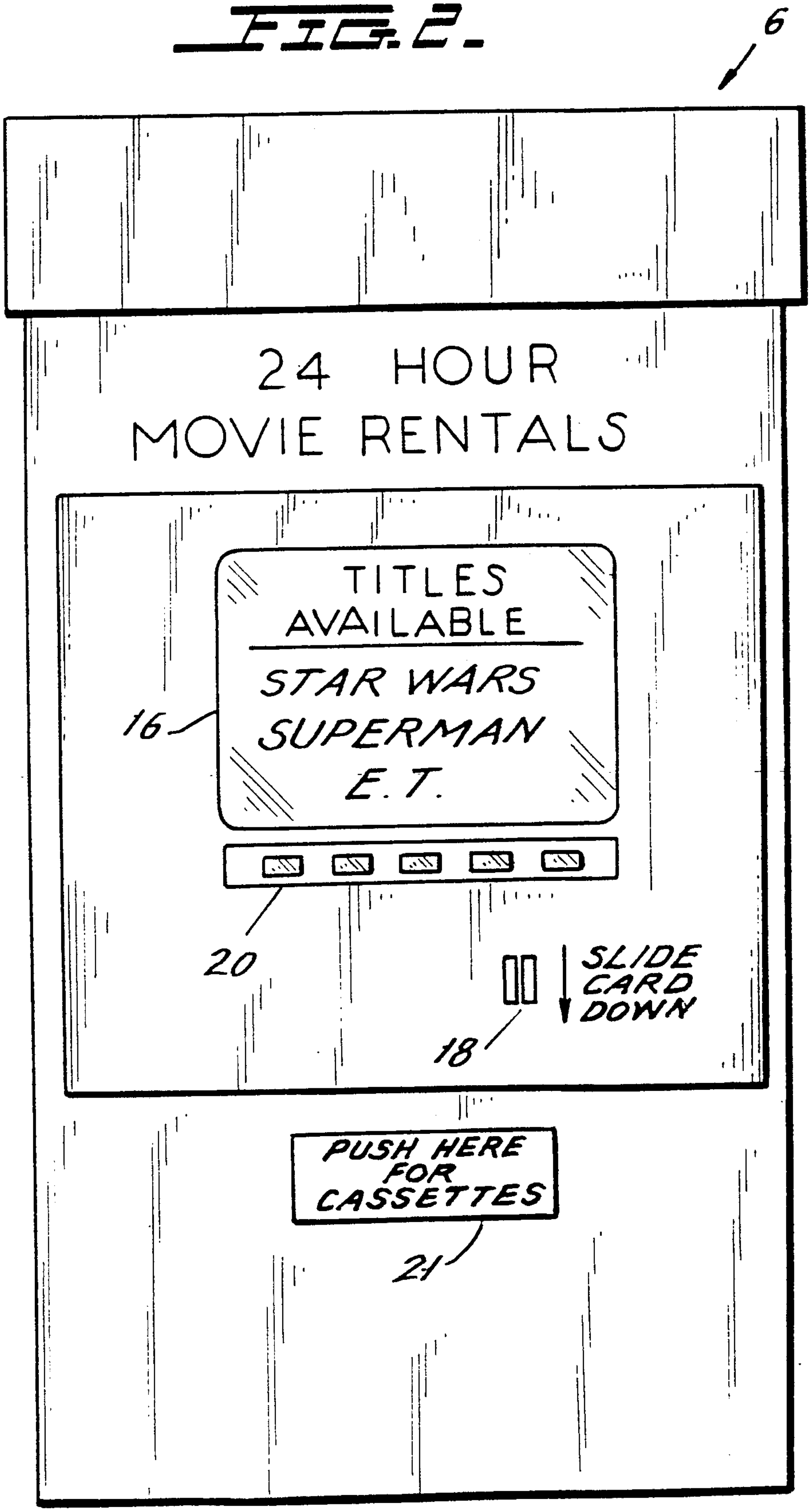
FIG. 2 is an illustration of the front face of the automated videocassette dispensing terminal which is preferably used in the of the present invention.

Referring now to FIG. 2, the automatic videocassette dispensing terminal 6 is shown projecting through the front window of a video store 10. Since the back of the machine sits inside the store, only the front face of the machine need be made weather-proof and resistant to vandalism and theft.

A CRT screen 16 is situated on the front panel of the automated terminal 6 which displays the titles available for rent, and for which the customer's identification indicates that he or she is authorized to rent (some families will request restrictions that prevent rental of "R" or "X" rated films). The front panel of the automated terminal 6 also has a bar code reader or a magnetic stripe reader 18, through which the individual is instructed to slide his membership or credit card. As described in further detail later, the machine reads the information on the membership card and sends this information immediately to the store's computer for approval.

The front face of the automated terminal 6 also includes a keypad 20, which the user manipulates in accordance with instructions presented on screen 16 in order to highlight and select a cassette that he or she wishes to rent. Once the customer has identified a title he or she wishes to rent, and the automatic videocassette dispensing terminal 6 has received approval from the host computer 2, the appropriate videocassette is released from its race and falls into a drawer behind a delivery door 21, from which it may be removed by the customer.

Figure 4:
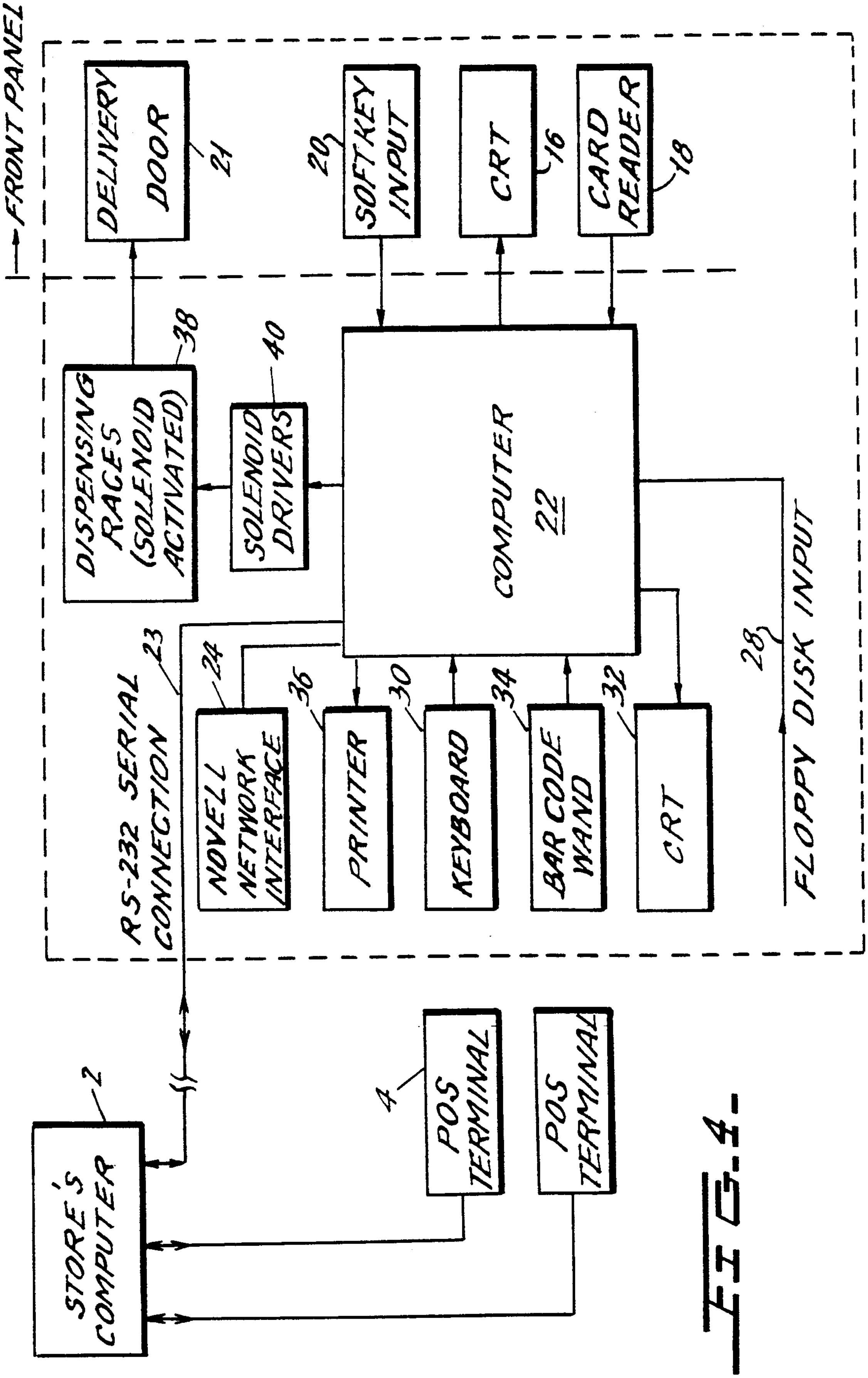
FIG. 4 is a block diagram of the system architecture including the main components of the present invention.

The electronics of the automated videocassette dispensing terminal 6 are relatively simple because most of the data processing is done by the host computer 2. As shown in FIG. 4, the system architecture is controlled by a computer 22, which is preferably IBM PC/XT compatible, and is equipped with 256 Kb RAM, a 20 MB hard disk and a 360 Kb floppy disk drive. This computer controls both the RUN function and the SERVICE function, both of which are described in further detail below. Computer 22 sends the user data in its original raw form and videocassette's numeric code to host computer 2 over an RS-232 serial connection 23. Optionally, a Novell network interface 24 may be used for communication between the two computers. If the store's videocassette rental system includes a credit card verification procedure, verification will be done by computer 2.

Personal computer 22 is loaded with overall system software via floppy disk input 28. The clerk chooses from among the service function options (described below) through keyboard 30. The instructions and menu for the SERVICE mode are displayed on CRT 32. When the store clerk adds or removes videocassettes from the inventory of the dispensing terminal 6, he or she wands the tapes in or out with bar code wand 34, which then sends the tape number to computer 22 which relays it to host computer 2. If a videocassette is being added, host computer 2 sends the title back to computer 22, and computer 22 files the information for future display. If a videocassette is removed, its title is deleted from the display file of computer 22. Printer 36 can be activated by keyboard 30 to print out service test results.

Computer 22 also controls the actual dispensing of videocassettes which are stored in dispensing races 38. In order to dispense a tape, computer 22 activates a specific solenoid driver 40 to release by gravity feed the appropriate cassette from dispensing races 38, from which it drops to delivery door 22 for retrieval by the customer.

As mentioned earlier, the front panel of the automated terminal 6 also includes a soft keypad 20, a CRT 16, and a card reader 18 to be used by the consumer in ordering desired videocassettes. No receipt is provided to the customer for rentals, and the automated videocassette dispensing terminal does not accept returns. Returns can be accepted either by a clerk at a POS terminal in the store or, after hours, through a drop slot. If the customer uses a drop slot, the return of the videocassette is registered by a clerk at a POS terminal 4 after the store opens the next day. Eliminating the automated return feature greatly simplifies the mechanics of the automated videocassette dispensing terminal, resulting in greater reliability and a reduction in cost. The procedure of encouraging returns in-person also gives the store better control over returns, allowing adjustments of overtime charges, etc. based upon particular circumstances. Moreover, in-person return gets the customer back into the store with its large display area, where he or she can be enticed to rent another videocassette.

Figure 5A:
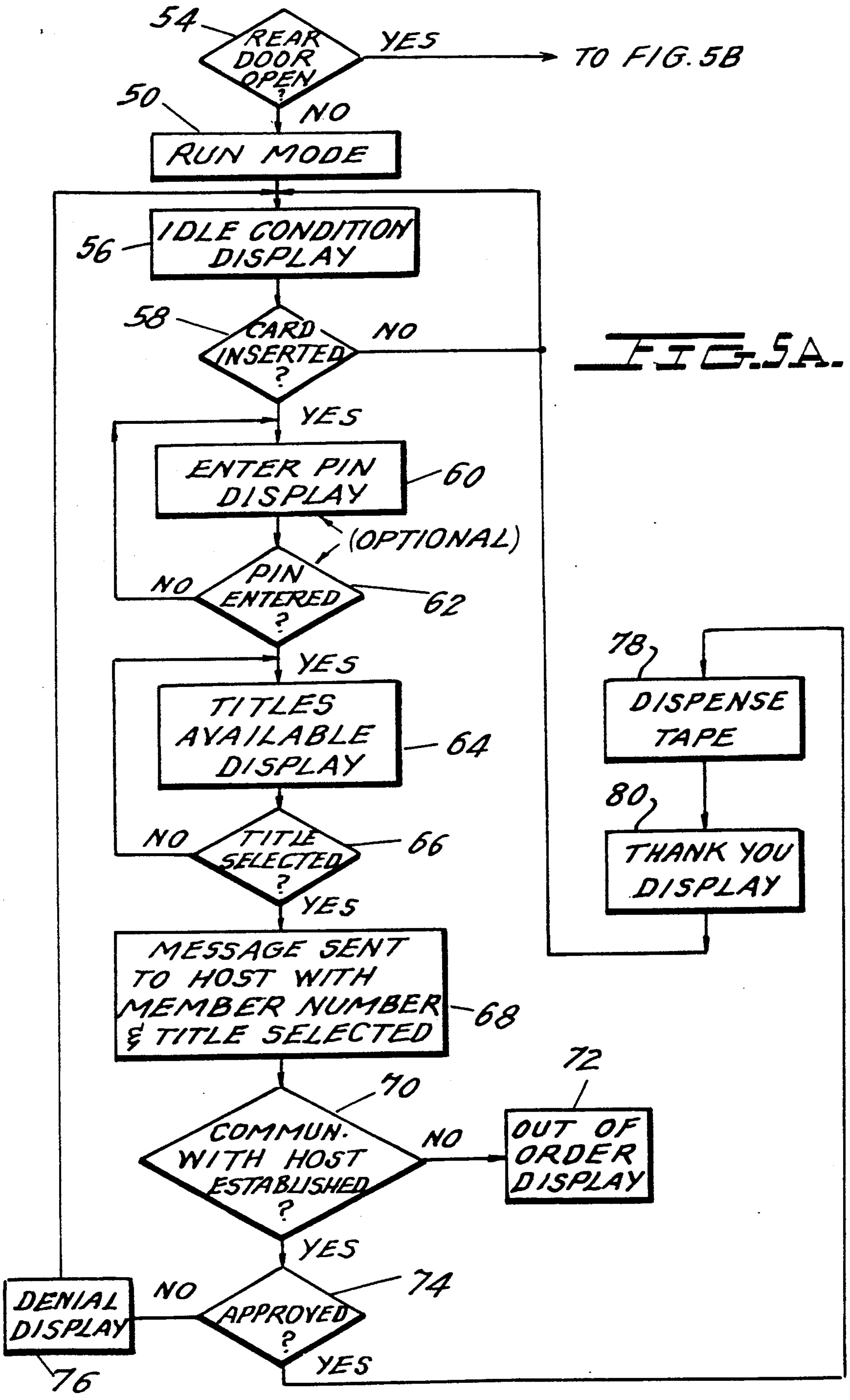
FIGS. 5(*a*) and 5(*b*) flow charts of the software which controls the automated renting sequence and service sequence of the videocassette dispensing terminal of the present invention.

The software which controls the above-described hardware will now be described, with reference to the software flow chart shown in FIGS. 5A and 5B. The software has two operating modes; the RUN MODE 50 for customer rentals and the SERVICE MODE 52 for all clerk functions. The software is always in the RUN MODE when the rear access doors of the automated videocassette dispensing terminal 6 are closed. When the doors are opened, a switch is activated that switches the software into the SERVICE MODE. Thus, the first step in the software flow chart is a rear door open check 54, the results of which dictate whether the software enters the SERVICE MODE or RUN MODE.

The RUN MODE, illustrated in 5A, is directed to the CRT 16 on the outside display panel. In the idle condition 56, the screen displays:

"TO RENT A MOVIE PLEASE INSERT YOUR MEMBERSHIP CARD AS INSTRUCTED BELOW."

The software then waits for a card to be inserted at step 58. When a card is entered, if the store has selected the optional personal identification number (PIN) routine, CRT 16 displays:

"PLEASE ENTER YOUR PERSONAL IDENTIFICATION NUMBER."

The unit then again waits for the PIN number to be entered at step 62. If no PIN number is entered, the screen returns to the IDLE display. Once a PIN number has been entered, the CRT screen 16 displays an alphabetized listing of titles on-hand. Screen 16 can also display price or price category, and possibly MPAA rating ("R"; "PG"; etc.) and genre (comedy, western, sci-fi). The bottom of the screen is reserved for keypad instruction that appear in boxes in each individual key as follows:

| Next Screen | Previous Screen | Scroll Up | Scroll Down | Select Rental |
|---|---|---|---|---|
| 1 | 2 | 3 | 4 | 5 |

The software then waits at step 66 for the customer to enter the selected title by highlighting the desired title and making the rental selection via keypad 20. After the SELECT key on the keyboard is pressed by the customer, personal computer 22 sends a message to the host computer 2 with the member's identification number and the title code of the tape selected. (step 68). Computer 22 waits for a return signal, at step 70, to ensure that communication with host computer 2 has been established. If automated terminal 6 is unable to contact host 2, the tape is not dispensed and the screen displays, at step 72:

"WE ARE UNABLE TO CONTACT OUR HOST COMPUTER. THIS DISPENSER IS TEMPORARILY OUT OF ORDER".

The unit then enters a 15 second time-out and then switches to an out of order condition until communication with the host computer 2 is restored. In this out of order condition, the screen displays:

"TEMPORARILY OUT OF ORDER.
SORRY FOR THE INCONVENIENCE.
PLEASE TRY AGAIN LATER."

If communication with the host is successfully established, the unit waits to see if the transaction has been approved (i.e. if the membership number is authorized). If the host sends back a denial code, the tape is not dispensed and the CRT screen 16 displays, at step 76:

"YOUR RENTAL HAS NOT BEEN APPROVED.
PLEASE CHECK WITH THE STORE MANAGER."

The unit then enters a 15 second time-out and returns to the idle screen 56. If the host computer 2 approves the transaction, the tape is dispensed at step 78 and CRT screen 16 displays a thank you message 80, whereupon the screen returns to idle display 56.

Figure 5B:
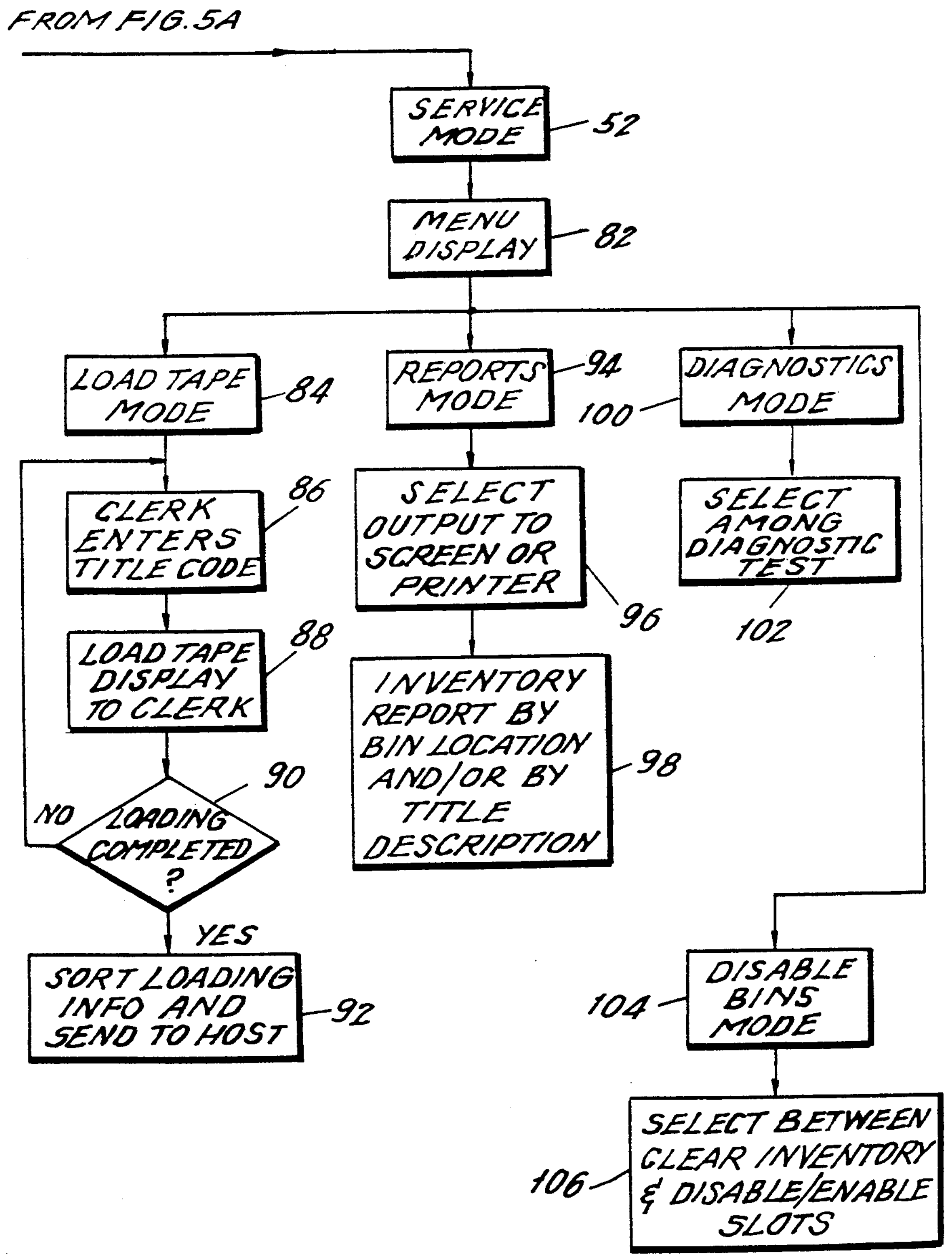

The SERVICE MODE, illustrated in FIG. 5B, is directed to the internal CRT 32 and the keyboard 30, both of which are located inside the rear doors of the unit. The initial screen of the SERVICE MODE is the clerk's menu 82, in which the CRT screen 32 displays:

"1. LOAD TAPES
2. REPORTS
3. DIAGNOSTICS
4. DISABLE BINS"

If the clerk selects #1 via keyboard 30, the unit enters the load tapes mode 84 and CRT screen 32 displays:

"ENTER TAPE NUMBER"

The clerk, in step 86, enters the title code by wanding the bar code label on the first cassette to be loaded with bar code wand 34. The screen then displays, as step 88:

"LOAD TAPE INTO BIN XX
ENTER NEXT TAPE NUMBER."

After each title code has been entered, the unit sends the entered number to the host computer 2, and host 2 sends back the corresponding alpha title description. These alpha descriptions and their associated numeric codes are temporarily stored in the memory of personal computer 22 awaiting sorting. The unit then waits, at step 90, for the wanding to be completed. When the clerk has finished loading the machine, he or she wands a special bar code label which is affixed to the inside of the rear door. This input terminates the LOAD TAPES function, adds the new title descriptions to the on-hand inventory file, and sorts the on-hand inventory file in alphabetical order at step 92. If the clerk selects #2, the unit enters the report mode 94, and the screen displays

"SEND REPORT TO
#1 SCREEN
#2 PRINTER"

After the clerk has selected whether the output will be sent to CRT screen 32 or printer 36 at step 96, the selection screen displays:

"REPORTS
1. INVENTORY REPORT BY BIN LOCATION
2. INVENTORY REPORT BY TITLE DESCRIPTION"

Then at step 98, the clerk chooses which of these two reports to receive on the selected output device.

If the clerk selects #3 from menu display 82, the unit enters the diagnostics mode 100 and the screen displays the following types of diagnostics which can be conducted:

"DIAGNOSTICS
1. TEST CRT
2. TEST CARD READER
3. TEST BARCODE READER
4. TEST PRINTER
5. TEST TRIP LEVERS
6. TEST DOOR LOCK"

The clerk, at step 102, selects which of the above steps he or she will run, and the unit executes the appropriate test.

If the clerk selects #4 from the clerk's menu 82, the unit enters the disabled bins mode 104 and the screen displays:

"1. CLEAR INVENTORY
2. DISABLE/ENABLE SLOTS"

The clerk selects one of these options. If the CLEAR INVENTORY option is selected the screen displays:

"1. BY TITLE CODE
2. BY LOCATION RANGE"

If, on the other hand, the disable/enable slots is chosen, the screen displays:

"1 DISABLE SLOT(S)
2. ENABLE SLOT(S)"

The disabled slot routine is used to exclude a defective slot location until it is repaired. A disabled slot is not recognized by the software program. After a defective slot has been repaired, the slot must be enabled for future use.

It should be noted that all screens in the RUN MODE have a 30 second time-out and then return to the idle screen. Also, when the customer is entering his or her PIN number, he or she is given three chances to enter the correct number, and if all three entries are incorrect, the screen returns to the idle screen.

Accordingly, the present invention as described above provides a unique system which provides 24-hour operation for video stores, while maintaining centralized compilation of customer rental and inventory information in the store's existing computer. The system of the present invention advantageously provides many options not available with prior art systems. For example, customers can make reservations for videocassette rentals and, if the reserved cassette is not picked up in-person during the business day, it can be left in the automated videocassette dispensing terminal for pick up later that evening. Similarly, finished photoprints could be left for customer pickup after hours in the automated dispensing terminal of the present invention.

Although the present invention has been described in connection with a preferred embodiment thereof, many other variations and modifications will now become apparent to those skilled in the art without departing from the scope of the invention. For instance, the system of the present invention could be used for dispensing any type of product (e.g. videodisks) which is practical to dispense from an automated terminal, and for which it is desired to maintain a centralized record of both over-the-counter and automated transactions. It is preferred, therefore, that the present invention be limited not by the specific disclosure herein, but only by the appended claims.

What is claimed is:

1. A system for renting videocassettes, comprising:

(a) a host computer in a point-of-sale management system of a video store for compiling and storing information relating to a customer list and videocassette inventory and customer rental information of the video store based upon rental information received as well as time of rental and return, said rental information comprising customer identification information and videocassette identification information for each videocassette rented:

(b) at least one manned point of sale terminal for renting and returning videocassettes which communicates to said host computer said rental information entered at said point of sale terminal by a store clerk for each videocassette rented to or returned by a customer at said point of sale terminal; and (c) at least one automated videocassette dispensing terminal for renting videocassettes which communicates to said host computer and operates in accordance with said information relating to said customer list and said videocassette inventory and customer rental information which is centrally stored in said host computer, said automated videocassette dispensing terminal communicating to said host computer said rental information entered by a customer for each videocassette dispensing terminal communicating to said host computer said rental information entered by a customer for each videocassette rented at said automated videocassette dispensing terminal;

wherein said host computer processes said rental information with said time of rental and return to calculate a proper rental fee for each returned videocassette and to update said videocassette inventory information which is centrally stored in said host computer.

2. A system for renting videocassettes as recited in claim 1, wherein said computer processes said customer identification information received from said automated videocassette dispensing terminal to determine whether a customer is authorized, and instructs said automated videocassette terminal whether or not to rent a videocassette to said customer.

3. A system for renting videocassettes as recited in claim 1, wherein said customer identification information is entered into said automated videocassette dispensing terminal by a bar code reader.

4. A system for renting videocassettes as recited in claim 1, wherein said customer identification information is entered into said automated videocassette dispensing terminal by a magnetic strip reader.

5. A system for renting videocassettes as recited in claim 1, wherein said customer identification information is entered into said automated videocassette dispensing terminal by means of a personal identification code.

6. A system for renting videocassettes as recited in claim 1, wherein said automated videocassette dispensing terminal includes a means for displaying titles for rent.

7. A system for renting videocassettes as recited in claim 1, wherein said automated videocassette dispensing terminal extends through an exterior wall of a video store and is available for customer rentals of videocassettes on a 24-hour basis.

8. A system for renting videocassettes as recited in claim 1, wherein said automated videocassette dispensing terminal is hard-wired to said computer.

9. A method for renting videocassettes, comprising:

(a) having a clerk enter rental information through a manned point of sale terminal in a video store as videocassettes are rented to and returned from a customer, said rental information comprising customer identification and videocassette identification information;

(b) providing an automated videocassette dispensing terminal from which customers can rent videocassettes by entering said rental information themselves;

(c) communicating said rental information from said manned point of sale terminals and said automated videocassette dispensing terminal to a host computer in a point-of-sale management system of said video store, said automated videocassette dispensing terminal operating in accordance with information relating to a customer list and videocassette inventory and customer rental information of said video store which is centrally stored in said host computer;

(d) compiling and storing said rental information which is stored in said host computer with time of rental and return to generate updated information relating to said videocassette inventory and customer rentals of videocassettes; and (e) processing said rental information with said time of rental and return in said host computer to calculate a proper rental fee for each returned videocassette.

10. A method for renting videocassettes as recited in claim 9, further comprising the step of processing said customer identification information in said host computer to determine whether a customer is authorized, and instructing said automated videocassette dispensing terminal whether or not to rent a videocassette to a customer based upon said authorization determination.

11. A method for renting videocassettes as recited in claim 8, wherein said customer identification information is entered into said automated videocassette dispensing terminal through a bar code reader.

12. A method for renting videocassettes as recited in claim 8, wherein said customer identification information is entered into said automated videocassette dispensing terminal through a magnetic card reader.

13. A method for renting videocassettes as recited in claim 9, wherein said customer identification information is entered into said automated videocassette dispensing terminal by means of a personal identification code.

14. A method for renting videocassettes as recited in claim 9, wherein a display means is employed at said automated videocassette dispensing terminal to display titles for rent.

15. A method for renting videocassettes as recited in claim 9, wherein said automated videocassette dispensing terminal projects thru the wall of said video store and is available for customer rentals of videocassettes on a 24-hour basis.

16. A method for renting videocassettes as recited in claim 9, wherein said automated videocassette dispensing terminal is hard-wired to said host computer.

17. A method for renting videocassettes as recited in claim 9, further comprising the step of loading said automated videocassette dispensing terminal with videocassettes enter a title code corresponding to each videocassette as it is loaded, sending said title code to said host computer, and having said host computer determine an alpha title description corresponding to side title code, and sending said alpha title description dispensing terminal for storage and display.

18. A system for renting products, comprising:

(a) a host computer in a point-of-sale system of a store for compiling and storing information relating to a customer list and product inventory and customer rental information of said store based upon rental information received as well as time of rental and return, said rental information comprising customer identification information and product identification information for each product rented;

(b) at least manned one point of sale terminal for renting and returning products which communicates to said host computer said rental information entered at said point of sale terminal by a store clerk for each product rented to or returned by a customer; and (c) at least one automated dispensing terminal for renting said products which communicates to said host computer and operates in accordance with said information relating to customer list and said product inventory and customer rental information which is centrally stored in said host computer, said automated dispensing terminal communicating to said host computer said rental information entered by a customer for each product rented at said automated dispensing terminal;

wherein said host computer processes said rental information with said time of rental and return to calculate a proper rental fee for each returned product and to update said product inventory information which is centrally sorted in said host computer.

* * * * *